US012782497B2

(12) United States Patent
Galloway

(10) Patent No.: US 12,782,497 B2
(45) Date of Patent: Nov. 3, 2026

(54) ROTATING REFLECTIVE BARCODES ENCODING TIME-VARYING INFORMATION IN REFLECTION PATTERNS SCANNED BY LIDAR SYSTEMS

(71) Applicant: The Government of the United States of America, as represented by the Secretary of the Navy, Washington, DC (US)

(72) Inventor: Kevin Galloway, Annapolis, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 1079 days.

(21) Appl. No.: 17/950,065

(22) Filed: Sep. 21, 2022

(65) Prior Publication Data

US 2023/0093224 A1 Mar. 23, 2023

Related U.S. Application Data

(60) Provisional application No. 63/246,337, filed on Sep. 21, 2021.

(51) Int. Cl.
*G01S 7/00* (2006.01)
*G01S 17/74* (2006.01)
*G01S 17/931* (2020.01)
*G06K 7/14* (2006.01)

(52) U.S. Cl.
CPC .............. *G01S 7/006* (2013.01); *G01S 17/74* (2013.01); *G01S 17/931* (2020.01); *G06K 7/1413* (2013.01)

(58) Field of Classification Search
None
See application file for complete search history.

(56) References Cited

U.S. PATENT DOCUMENTS 8,777,107 B1 * 7/2014 Bao .................. G06K 19/06046 235/462.38
10,339,353 B2 * 7/2019 Marco ...................... G06K 7/10
2020/0012829 A1 * 1/2020 Davidson ........... G01C 21/1654
2021/0311205 A1 * 10/2021 Davidson .............. G01S 19/421

* cited by examiner

*Primary Examiner* — Jyotsna V Dabbi
(74) *Attorney, Agent, or Firm* — US Naval Research Laboratory; William P. Ladd

(57) ABSTRACT

A system and method are provided for encoding information in a relatively dense and time-varying manner. A reflector or retroreflector is wrapped around a rotating member, such as a cylinder, (also referred to as "Rotational LIDAR Barcodes"), which encodes relatively longer data messages, as compared to a static barcode, which can be detected by a LIDAR system and decoded from every direction, i.e. bearings angles of 0-360 degrees, even when partially obstructed.

25 Claims, 9 Drawing Sheets

ROTATING REFLECTIVE BARCODES ENCODING TIME-VARYING INFORMATION IN REFLECTION PATTERNS SCANNED BY LIDAR SYSTEMS

CROSS REFERENCE TO RELATED PATENT(S) AND APPLICATION(S)

This application claims the benefit of U.S. Provisional Application No. 63/246,337, filed Sep. 21, 2021, and entitled ROTATING REFLECTIVE BARCODES ENCODING TIME-VARYING INFORMATION IN REFLECTION PATTERNS SCANNED BY VEHICLE-MOUNTED LIDAR SYSTEMS, which is hereby incorporated in its entirety by reference.

BACKGROUND

This disclosure, and the exemplary embodiments described herein, relates generally to autonomous vehicles, and more particularly to encoding and transmitting information using rotating reflective barcodes encoding time-varying information in reflection patterns scanned by lidar systems. While the exemplary embodiments described are related to autonomous vehicles, it is to be understood that the scope of this disclosure is not limited to such application.

For autonomous vehicles of any scale (whether self-driving automobiles or small mobile robots), it is necessary to obtain information about the surrounding environment in order to maneuver safely and accomplish desired tasks, such as arriving at a desired location at a precise time. Vehicles typically obtain this data through a combination of external information sources, such as the satellite-based Global Positioning System (GPS), and onboard sensors, such as radar, LIDAR (light detection and ranging), and cameras. External sources such as GPS are extremely useful but can have limited availability in certain contexts, such as underground tunnels or in the event of accidental disruption or adversarial disabling of GPS satellites. With regards to onboard sensors, radar and LIDAR provide range measurements and are therefore typically used for object avoidance and maintaining position in the roadway. Monocular cameras don't have range measurements (though stereoscopic setups can yield some depth information), but their high resolution and ability to see color make them useful for understanding the important detailed meaning of a scene, such as traffic signs and lane markings. However, processing of the camera data is typically accomplished through machine learning and artificial intelligence (AI) algorithms, which can impose a significant computational expense. Since cameras typically have a limited field-of-view, a 360-degree surround view can only be obtained by using multiple cameras and digitally stitching together their individual views.

Most self-driving vehicles and autonomous robots are equipped with LIDAR sensors to provide a high-resolution map of the surrounding environment in real-time. The LIDAR data that is most typically used for this application is the point cloud consisting of detected range to the closest object at each bearing. However, many LIDAR systems also provide a measure of the return intensity (also known as reflectance or reflectivity) at each bearing angle. US Patent Application Publication No. 2020/0292735 introduced the idea of using specially designed retroreflectors to encode data in the LIDAR intensity data, analogous to a traditional printed barcode. These retroreflectors (which we will refer to as "static Lidar barcodes") can be placed in the traffic infrastructure to provide data to LIDAR-equipped vehicles by means of the LIDAR intensity patterns. While appealing in its simplicity, it is severely limited in the amount of data that can be encoded.

Described herein is a system and method for encoding information in a relatively dense and time-varying manner. In exemplary embodiments described, a retroreflector or reflector is wrapped around a rotating cylinder (also referred to as "Rotational LIDAR Barcodes"), which can encode significantly longer data messages which can be detected and decoded from every direction, even when partially obstructed.

INCORPORATION BY REFERENCE

The following publications are incorporated by reference in their entirety.

U.S. 2020/0292735, patent application Ser. No. 16/754,116, filed Oct. 5, 2018, and entitled RETROREFLECTORS PROVIDING INFORMATION ENCODED IN REFLECTED NON-VISIBLE LASER WHILE RETAINING VISIBLE LIGHT SAFETY PROPERTIES.

U.S. Pat. No. 10,147,469, patent application Ser. No. 15/588,661, granted Sep. 17, 2019, and filed May 7, 2017, and entitled NAVIGATION USING SELF-DESCRIBING FIDUCIALS.

U.S. Pat. No. 10,145,993, patent application Ser. No. 15/862,408, granted Dec. 4, 2018, and filed Jan. 4, 2018, and entitled RETROREFLECTORS PROVIDING INFORMATION ENCODED IN REFLECTED NON-VISIBLE LASER WHILE RETAINING VISIBLE LIGHT SAFETY PROPERTIES.

BRIEF DESCRIPTION

In accordance with one embodiment of the present disclosure, disclosed is a rotational LIDAR barcode operatively associated with a LIDAR barcode detection system comprising: a cylindrical member including an outside face, the outside face including a vertical height and a horizontal width, the horizontal width equal to a circumference of the cylinder face; a barcode pattern operatively attached to the cylindrical member outside face, the barcode pattern including a pattern of reflective areas and nonreflective areas representing a binary barcode data message; a rotator operatively coupled to the cylindrical member, the rotator rotating the cylindrical member and operatively attached barcode pattern, and a mount configured to align the barcode pattern, as it rotates, to reflect light received from the LIDAR barcode detecting system back to the LIDAR barcode detecting system.

In accordance with another embodiment of the present disclosure, disclosed is a method of encoding and decoding data represented as a barcode using a rotational LIDAR barcode and a vehicle mounted LIDAR system comprising: wrapping a cylinder face of a cylinder with a barcode pattern including a pattern of reflective areas and nonreflective areas representing a binary barcode data message to be decoded by the vehicle mounted LIDAR system; rotating the cylinder and wrapped barcode pattern at a predetermined angular speed or range of speeds, a rotational plane of the cylinder and wrapped barcode pattern providing for reflecting at least one beam transmitted from the vehicle mounted LIDAR system; and the vehicle mounted LIDAR system scanning the rotating cylinder and wrapped barcode pattern and decoding the wrapped barcode pattern to determine the data message associated with the wrapped barcode pattern.

In accordance with another embodiment of the present disclosure, disclosed is a vehicle mounted LIDAR and rotational LIDAR barcode system comprising: a vehicle mounted LIDAR system; and a rotational LIDAR barcode including: a cylindrical member including an outside face, the outside face including a vertical height and a horizontal width, the horizontal width equal to a circumference of the cylinder face; a barcode pattern operatively attached to the cylindrical member outside face, the barcode pattern including a pattern of reflective areas and nonreflective areas representing a binary barcode data message; a rotator operatively coupled to the cylindrical member, the rotator rotating the cylindrical member and operatively attached barcode pattern; and a mount configured to align the barcode pattern, as it rotates, to reflect light received from the vehicle mounted LIDAR system back to the vehicle mounted LIDAR system.

BRIEF DESCRIPTION OF THE DRAWINGS

For a more complete understanding of the present disclosure, reference is now made to the following descriptions taken in conjunction with the accompanying drawings, in which:

FIG. 4A shows the barcode pattern for 12-bit code 010101001011 in a wrapped form, and FIG. 4B shows both the barcode pattern for 12-bit code 010101001011 in an unwrapped form and a wrapped form. Note: according to this embodiment, the non-reflective bits are made to be physically 3 times wider than reflective bits because the reflective bits appear wider in the intensity pattern;

In FIG. 5B, note that the barcode pattern, i.e. 010101001011, is visible around bearing angle 90 degrees;

DETAILED DESCRIPTION

Described herein is a system and method for encoding information in a relatively dense and time-varying manner.

In exemplary embodiments, a retroreflector is wrapped around a rotating cylinder (also referred to as "Rotational LIDAR Barcodes"), which can encode significantly longer data messages which can be detected and decoded from every direction, even when partially obstructed.

Rotational LIDAR Barcodes can be constructed as patterns of alternating strips of reflective and non-reflective material of varying widths, wrapped around a rotating cylinder. They are designed to produce barcode-like reflection patterns when scanned by LIDAR units on mobile vehicles, with the rotation speed of the barcode designed for the optimal tradeoff between scan accuracy and scan time. The particular patterns can be detected in the LIDAR intensity data received at the vehicle and present a method of encoding data in a traffic infrastructure for LIDAR-equipped vehicles to detect and decode. Rotational LIDAR Barcodes could be used for a wide array of applications. First, they could be used to mark important aspects of the traffic infrastructure such as lane closures, traffic signs, parking lanes, handicapped parking spots, store fronts, and other landmarks. Second, they could be used to certify the authenticity of traffic signs (detected by camera-based systems) to counter possible spoofing attacks. Third, they could be mounted on emergency vehicles as a visual cue (in addition to the typical flashing lights) to help self-driving vehicles detect approaching emergency vehicles approaching from any direction. For mobile robots, Rotational LIDAR Barcodes could be used in laboratory or warehouse environments to indicate prescribed traffic patterns or points of interest, or in any other context where automatic detection of landmarks or other vehicles would be helpful (e.g., amusement parks, autonomous golf carts, etc.).

The foregoing and other features of this disclosure and the exemplary embodiments described herein, are hereinafter described in greater detail with reference to the accompanying drawings.

U.S. Pat. No. 10,145,993 introduced a method to encode data into an environment using specially designed retroreflectors, which can be detected by means of LIDAR sensors already installed on most self-driving vehicles and autonomous robots and can be processed and decoded at a low computational cost. These systems can augment existing camera-based methods for understanding the surrounding environment, providing a low-cost method for encoding data into the traffic infrastructure. However, this method based on static retroreflectors is severely limited in the density of data which can be effectively encoded.

Figure 1:
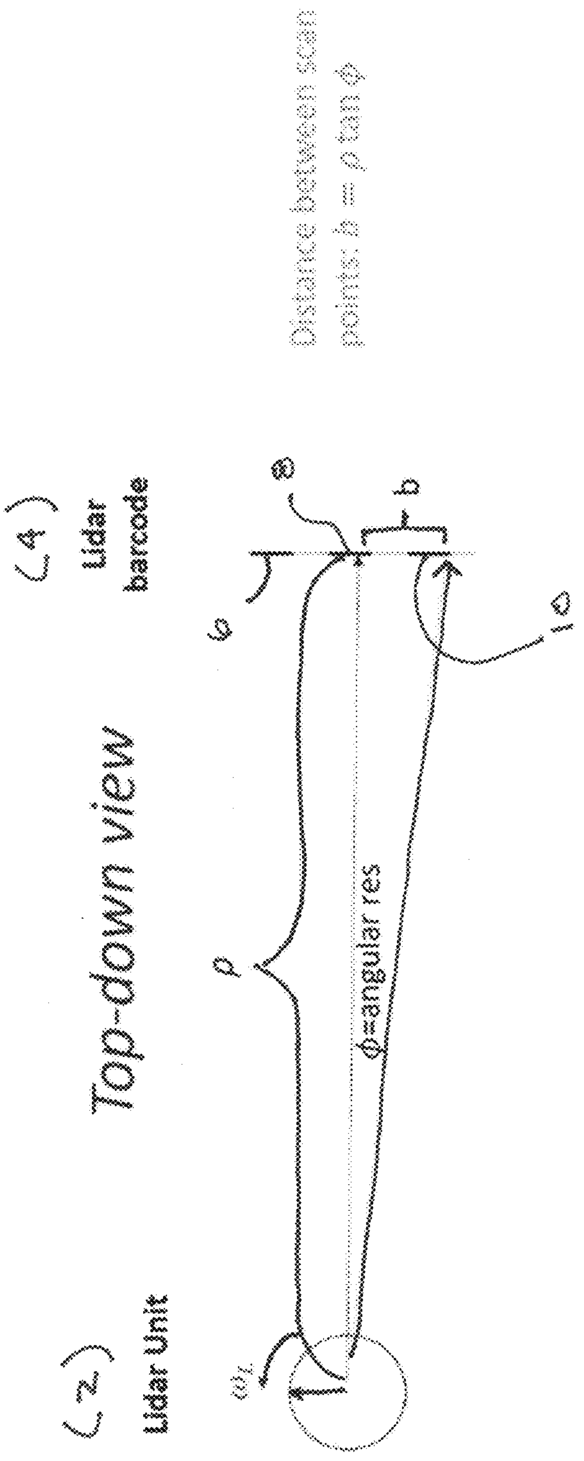
FIG. 1 (Prior Art)
FIG. 1 is a top-down view of a conventional static LIDAR barcode system which Illustrates limitations on bit density with static LIDAR retroreflectors such as those described in U.S. Pat. No. 10,145,993.

With reference to FIG. 1, shown is a top-down view of a conventional static LIDAR barcode system which Illustrates limitations on bit density with static LIDAR retroreflectors. As shown in FIG. 1, the distance b between successive scan points on the barcode target is given by $b=\rho \tan(\phi)$, where $\phi$ is the angular resolution of the LIDAR scanning unit 2 and $\rho$ is the distance between the vehicle-mounted LIDAR unit and the barcode target 4, which includes reflective strips 6, 8, 10 spaced by nonreflective strips. In other words, separation of sampling points on static planar barcode face depends on LIDAR angular resolution and distance p between LIDAR-equipped vehicle and barcode, resulting in low data density. For example, if a LIDAR unit 2 has an angular resolution of 0.1 degrees, when the LIDAR-equipped vehicle is 50 meters away from the barcode target 4 the LIDAR scan points will be spaced at an interval of approximately 9 cm on the target face. For this case, to obtain at least one LIDAR scan point on each information bit in a 32-bit message would require a target face of 280 cm (i.e., ~9 feet) wide. (As a practical matter, successful detection and decoding would most likely require more than one sample per bit.)

U.S. Pat. No. 10,417,469 is similar in theme but distinctly different in implementation and purpose. U.S. Pat. No. 10,417,469 revolves around the use of "self-describing fiducials" (such as barcodes) which can encode navigation information which mobile agents can detect with cameras. The main difference is that U.S. Pat. No. 10,417,469 uses only passive camera-based systems for detection, rather than active laser scanners (e.g., Lidar) to illuminate the targets.

Figure 2:
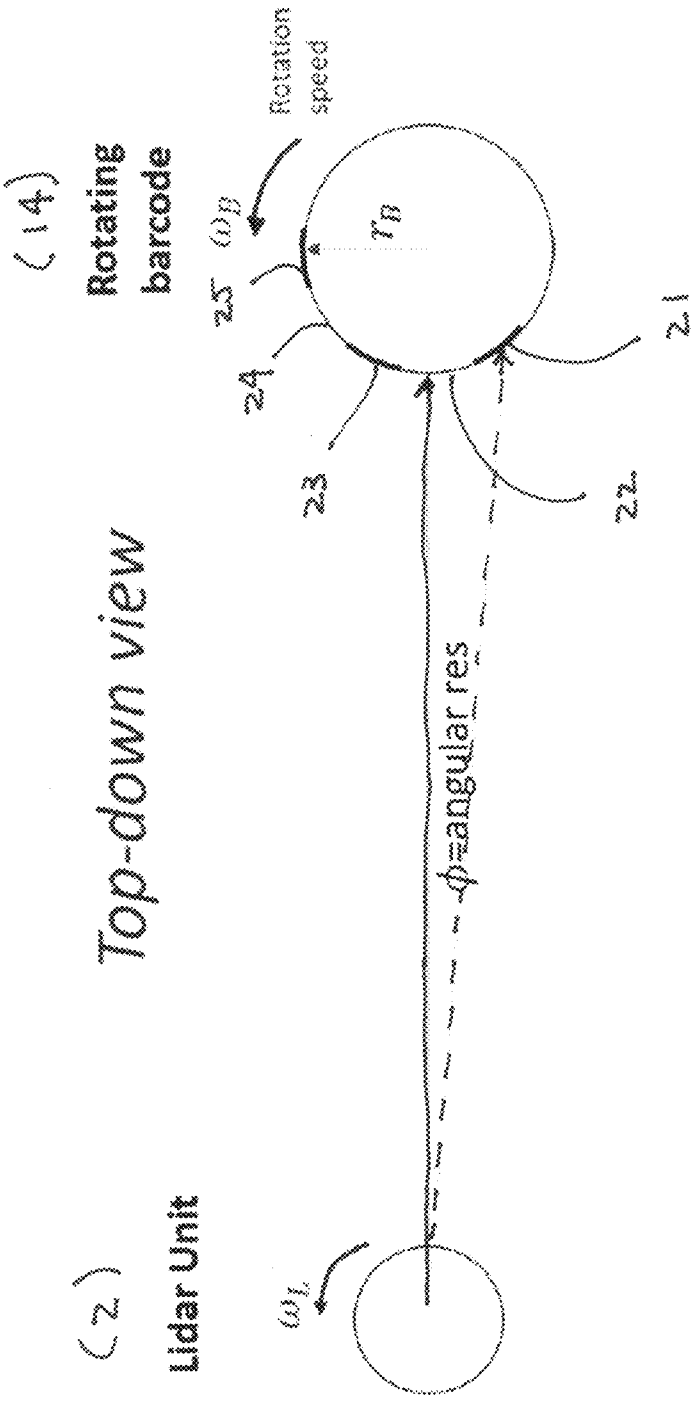
FIG. 2 is a top-down view of a rotating barcode and LIDAR scanning system according to an exemplary embodiment of this disclosure.

LIDAR scanners operate by using a laser to transmit ultraviolet, visible light, or near infrared to illuminate the surrounding environment and then analyzing the reflected energy to determine range to detected objects. Automotive LIDAR typically operates in the infrared range, at wavelengths of either 905 nm or 1550 nm. According to exemplary embodiments of this disclosure, Rotational LIDAR Barcodes refers to signs (or "targets") made of alternating strips of materials that are either reflective or non-reflective (i.e., absorbent) of energy at those wavelengths, with the sign mounted on a rotating cylinder. FIG. 2 is a top-down view of a rotating barcode 14 and LIDAR scanning system 2 according to an exemplary embodiment of this disclosure. As shown, the rotating barcode 14 includes a cylindrical member including an outside barcode face 20, the barcode face including a series of reflective areas 21, 23, 25 and nonreflective areas 22, 24 representing a binary barcode data message While the static planar LIDAR barcodes described in the prior art cited above are appealing in their simplicity to implement, they suffer from several significant drawbacks. First, they are by definition directional in nature and therefore can only be observed and decoded from a particular field of view. Within that field of view, parallax effects may present challenges to detection and decoding from certain angles as well. Secondly, the entire barcode must be in view for successful decoding, and therefore even partial obstructions to the view will prevent successful detection and decoding. Lastly, and most significantly, these static barcodes are severely limited in the density of data which they can effectively encode at longer ranges, due to the spreading of sample points on the barcode based on LIDAR angular resolution. Again, as shown in FIG. 1, with LIDAR angular resolution $\phi$ at a range of $\rho$ from the barcode 14, the distance between adjacent sample points on the barcode face is approximately $b=\rho \tan(\phi)$. More specifically, if we assume that one LIDAR ray strikes the barcode at a right angle, then the nth adjacent ray impacts at $b=\rho \tan(n\phi))$ away from the first impact point. If no rays strike the barcode at a right angle, then the geometry is slightly different, but $\rho \tan \phi$ is still a good approximation and illustrates the issue with data density constraints.

As an example, for a TURTLEBOT3 robot as used for experimental implementations of the disclosed rotational LIDAR barcode as described herein, the LIDAR unit has an angular resolution of 1 degree which results in sample points separation of approx. 5 cm when the robot is 3 m from the barcode. For the static barcode case, to obtain at least one LIDAR scan point on each information bit in a 32-bit message would require a target face 168 cm wide, and most likely successful detection and decoding would require more than one sample per bit. While LIDAR units with better angular resolution are certainly available on the market, many of these are intended to be operated at longer ranges (i.e., larger values of $\rho$), which lead to the same issue.

Due to these limitations for static planar LIDAR barcodes, described herein is a rotational LIDAR barcode based on time-varying versions of a retroreflector(s) wrapped around a rotating cylinder. The rotational LIDAR barcode can encode significantly longer data messages which can be detected and decoded from every direction, even when partially obstructed.

Figure 3:
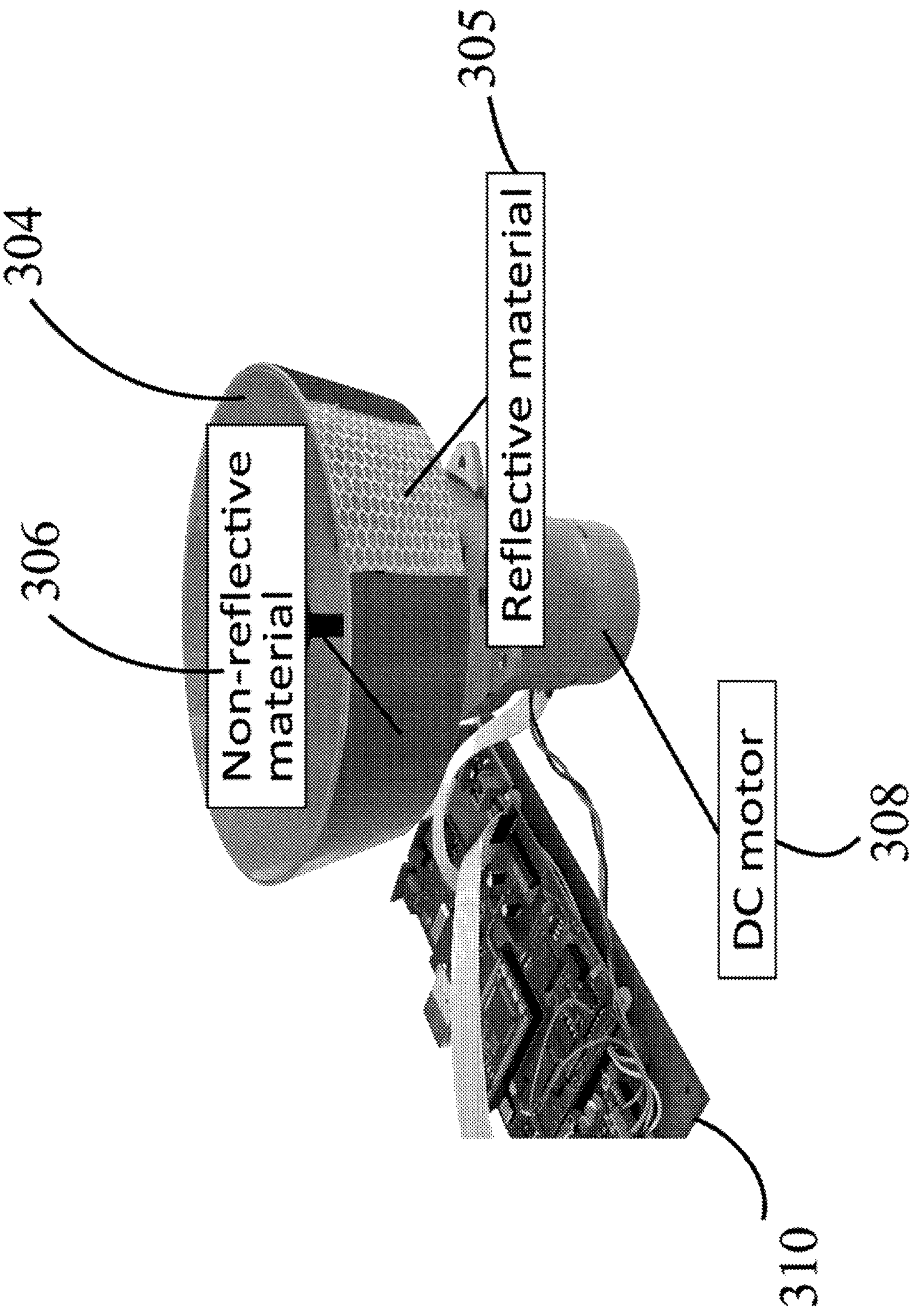
FIG. 3 shows a prototype of a rotational LIDAR barcode according to an exemplary embodiment of this disclosure.

FIG. 3 shows a prototype of a rotational LIDAR barcode 304 according to an exemplary embodiment of this disclosure. A 3d-printed cylinder is mounted on top of a DC motor 308, with the barcode portion of the target fabricated from reflective "safety tape" 305 and non-reflective matte black "gaffer's tape" 306. The DC Motor 308 is controlled by a DC motor controller 310. The widths of the strips can be arranged to encode a binary pattern to represent data, similar to the standard UPC barcodes that are used in product identification. When a mobile vehicle with a LIDAR scanner is operating in the vicinity of the Rotational LIDAR Barcode, the LIDAR return intensity (also known as reflectivity or reflectance) along bearing angles directed towards the barcode can be tracked over time to effectively scan the barcode data.

Figure 4A:
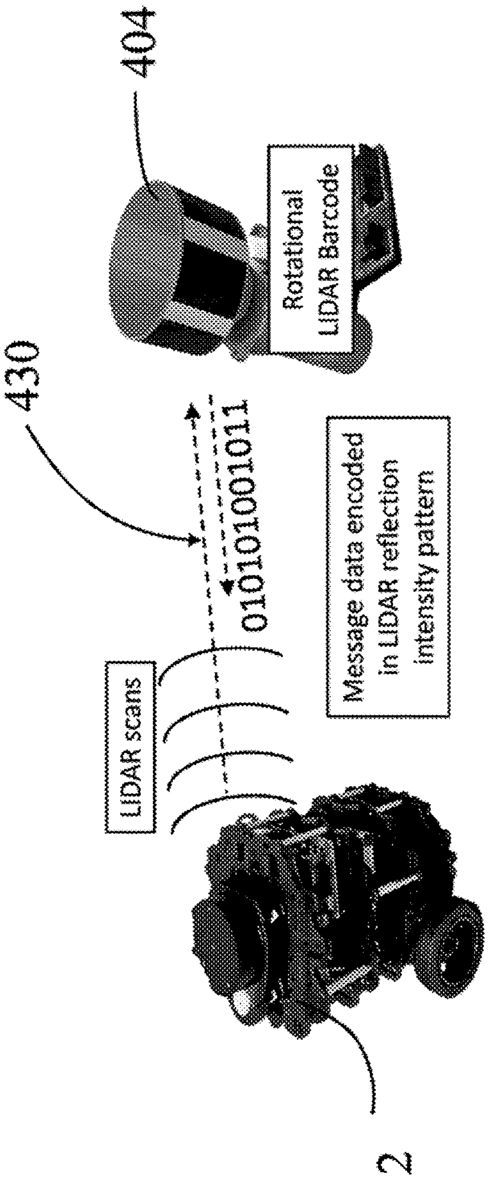
FIGS. 4A and 4B shows another prototype of a rotational LIDAR barcode and LIDAR scanning system according to an exemplary embodiment of this disclosure, where the rotational barcode represents the 12-digit code: 010101001011.
Figure 4B:
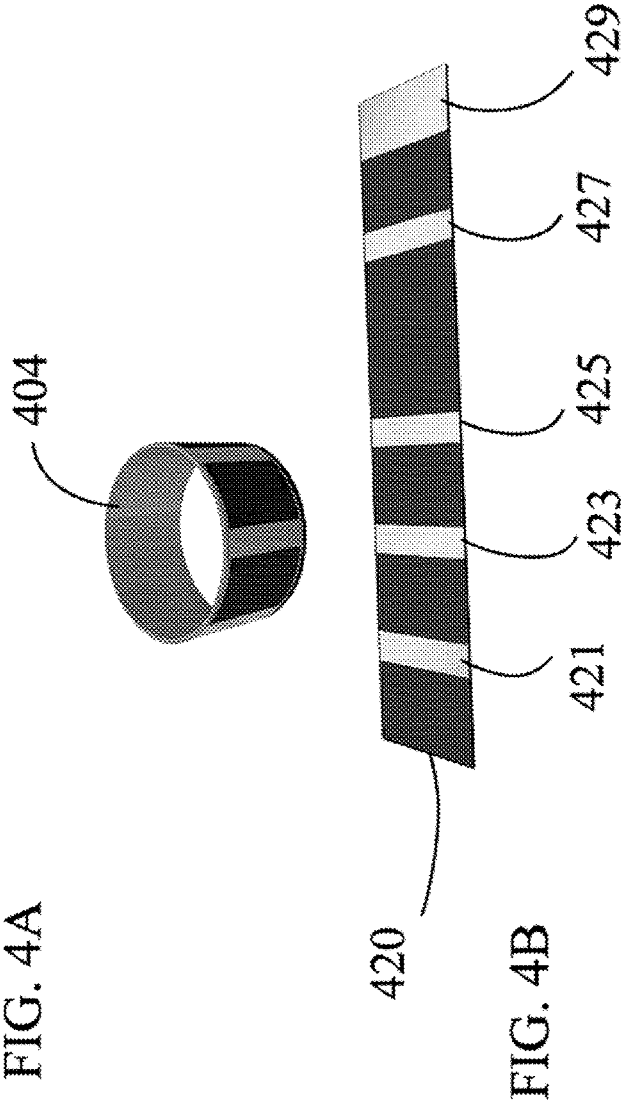

With reference to FIGS. 4A and 4B, shown is another protype of a rotational LIDAR barcode 404 and LIDAR scanning system 2 according to an exemplary embodiment of this disclosure, where the rotational barcode 404 represents the 12-digit code: 010101001011 430. FIG. 4A shows the barcode pattern for 12-bit code 010101001011 in a wrapped form, and FIG. 4B shows both the barcode pattern for 12-bit code 010101001011 in an unwrapped form 420 and a wrapped form 404. Note: according to this embodiment, the non-reflective bits are made to be physically 3 times wider than reflective bits 421, 423, 425, 427, 429 because the reflective bits appear wider in the intensity pattern.

Figure 5A:
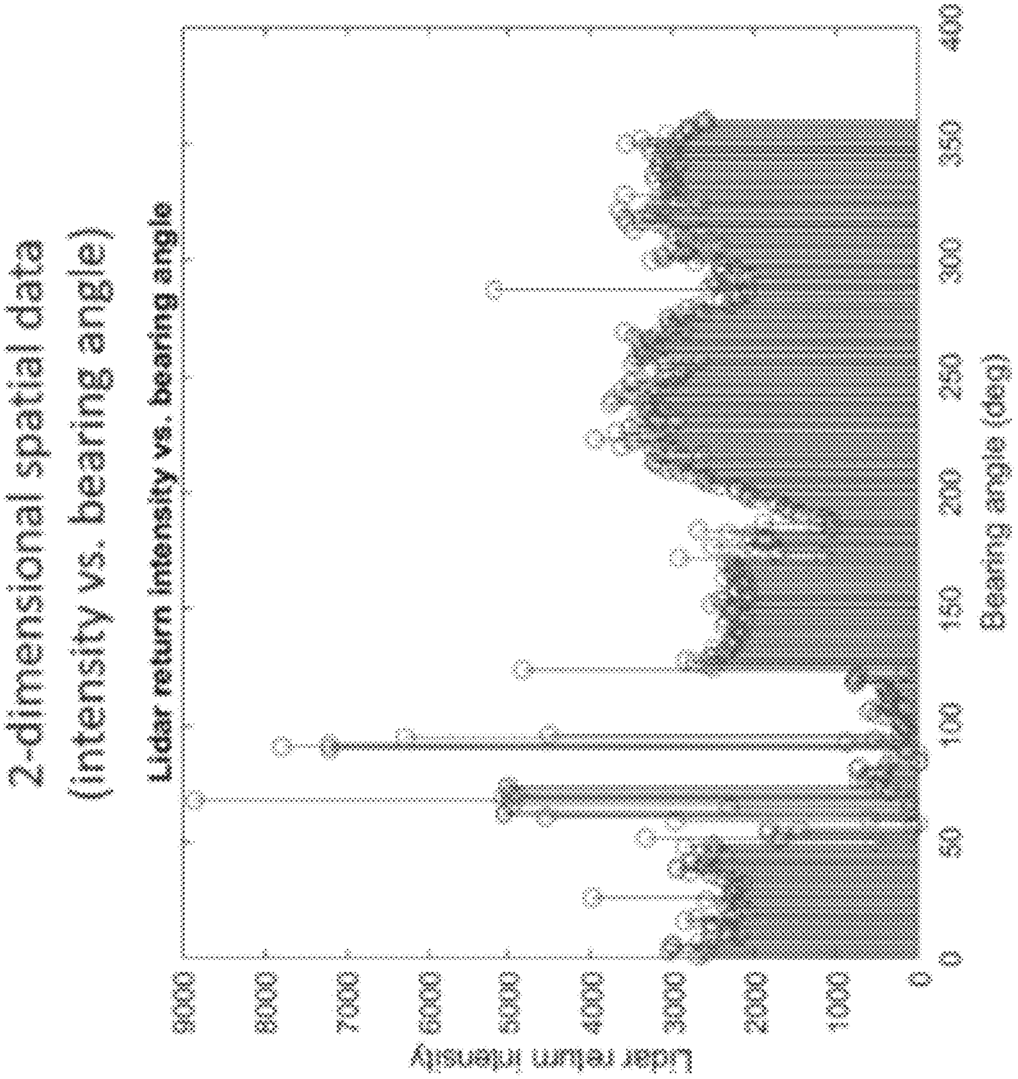
FIGS. 5A and 5B are Intensity vs Bearing Angle data graphs which show static barcodes provide only 2-dimensional spatial data (FIG. 5A), while the incorporation of rotation introduces a time dimension for rotational LIDAR barcodes (FIG. 5B), allowing for time-based sampling of the barcode.
Figure 5B:
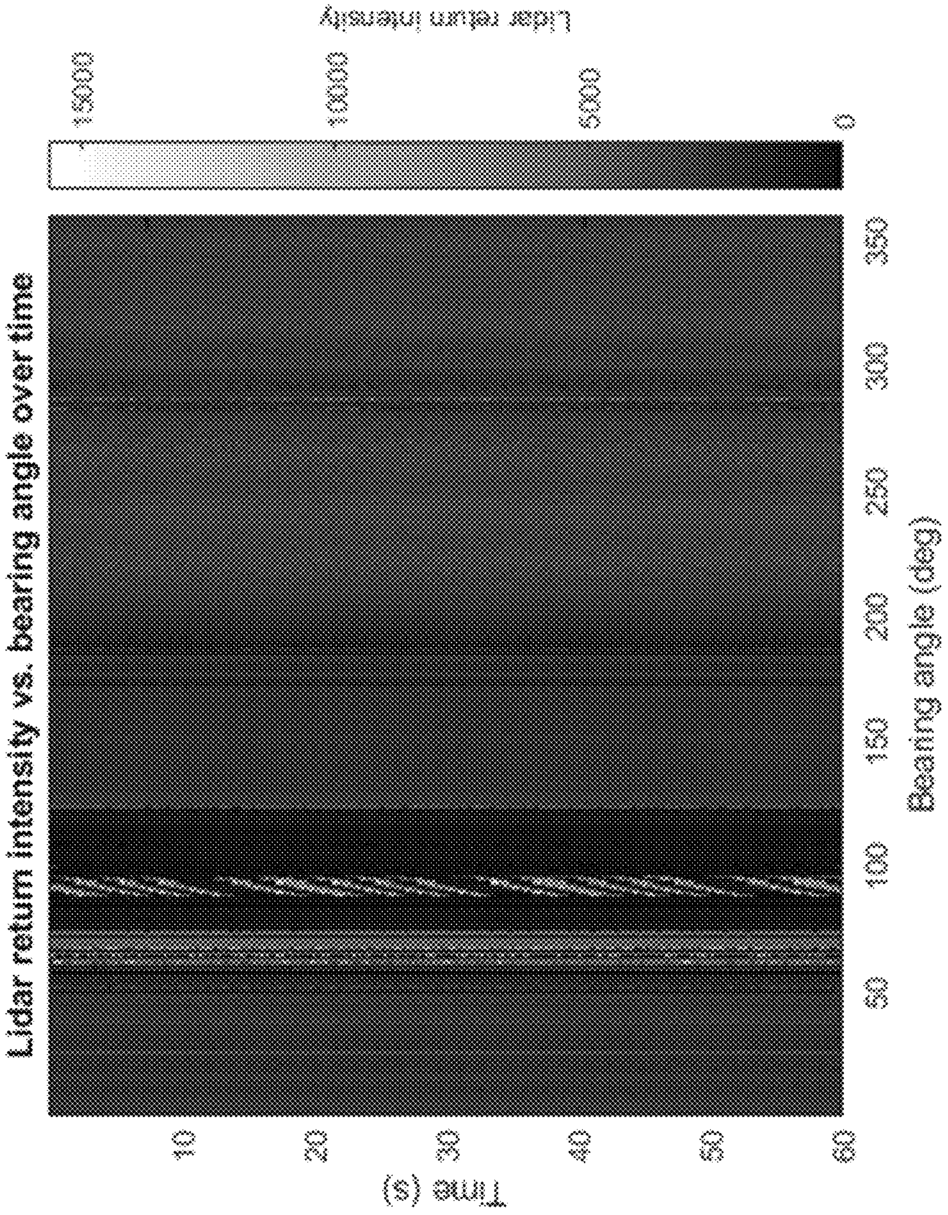

It is important to note that the rotation of the barcode effectively adds an additional temporal dimension to the data. With reference to FIGS. 5A and 5B, shown are Intensity vs Bearing Angle data graphs which show static barcodes provide only 2-dimensional spatial data (FIG. 5A), while the incorporation of rotation introduces a time dimension for rotational LIDAR barcodes (FIG. 5B), allowing for time-based sampling of the barcode. In FIG. 5B, note that the barcode pattern, i.e. 010101001011, is visible around bearing angle 90 degrees.

While the spatial sampling resolution is completely constrained by the angular resolution of the LIDAR unit, the time-based sampling resolution can be controlled by selection of the rotation rate for the barcode. Thus, the limitation on bit density for static retroreflectors described in U.S. Pat. No. 10,145,993 can be overcome with Rotational LIDAR Barcodes by selection of the time-based sampling rate.

Figure 6:
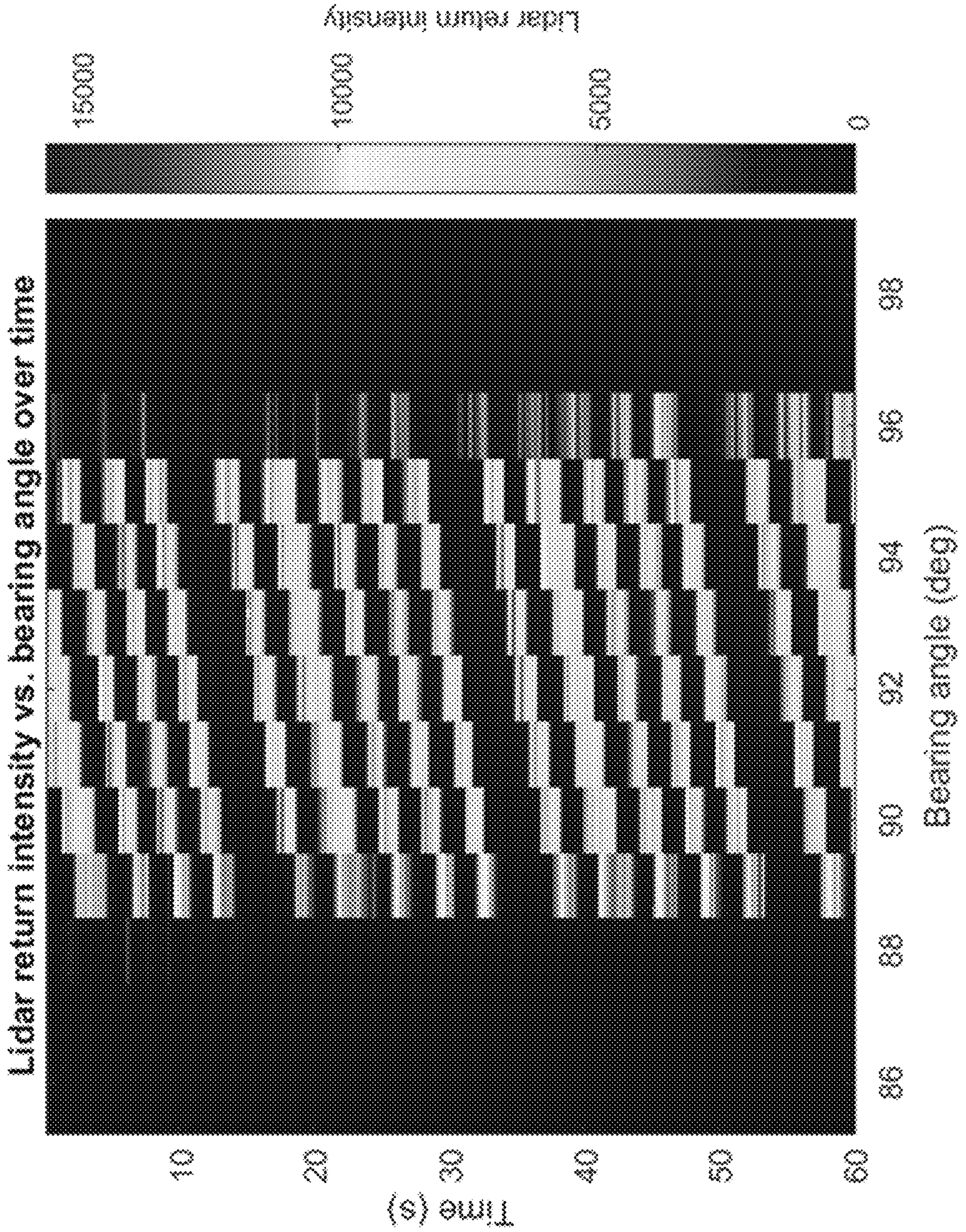
FIG. 6 shows a waterfall display of LIDAR return intensity vs bearing angle, as shown in FIG. 5B, over time zoomed in on bearing angles of approximately 86 degrees to 98.

The rotation of the barcode also creates a unique spatiotemporal signature in the sensor data, which enables detection in a cluttered environment by analysis of the statistics of the intensity data. Also, based on the radius of the Rotational LIDAR Barcode, the angular resolution of the LIDAR, and the distance between the LIDAR-equipped vehicle and the barcode target, it is possible that multiple LIDAR beams (along different neighboring bearing angles) will strike the target on a given sweep. FIG. 6 depicts this phenomenon with a zoomed-in version of the waterfall display centered on the Rotational LIDAR Barcode.

With reference to FIG. 6 shown is a waterfall display of LIDAR return intensity vs bearing angle, as shown in FIG. 5B, over time zoomed in on bearing angles of approximately 86 degrees to 98. The zoomed-in version shows that the barcode is actually visible along bearing angles around 90 degrees, showing up as time-shifted versions of the same sequence. These neighboring channels can be used for parallel processing of the data as well as error detection and correction since the same message sequence is encoded in each of the visible channels.

Figure 7:
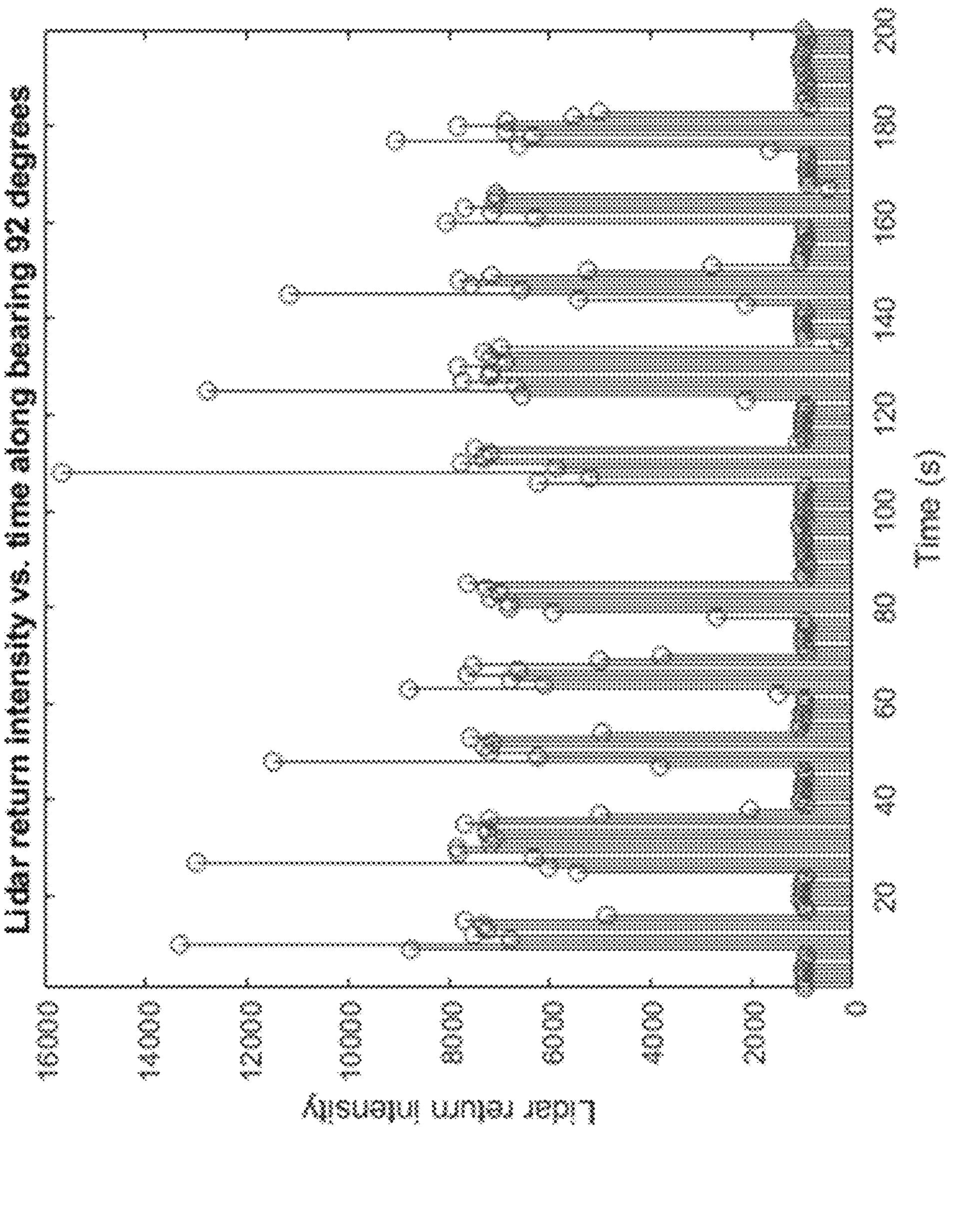
FIG. 7 is a plot of LIDAR return intensity vs. time along bearing 92 degrees.

An example of the sampled bitstream received along a particular bearing during this experiment is shown in FIG. 7. Though the bitstream is noisy, the repeating binary message can be seen in the contrasting low and high LIDAR return intensity values. Signal processing algorithms can be used to detect and decode the bit stream.

As mentioned previously, one advantage of Rotational LIDAR barcodes is that their time-based variation produces a unique signature which can be exploited for detection purposes. In what follows, we will describe a two-stage approach that provides reliable detection from reasonable ranges in experimental trials.

The first stage of our detection process is based on windowed standard deviation of the LIDAR return intensity measurements along each bearing angle. Bearings which reach a prescribed threshold for minimum variation during the observed window are returned as candidates to pass to the second stage.

The second stage makes use of the fact that neighboring bearing angles which view the barcode will provide bit streams that are time-delayed versions of the neighbor angle bit streams. We can therefore compare a correlation of shifted versions of neighbor bearings to see if a particular shift meets a prescribed minimum correlation.

As previously described, rotational LIDAR barcodes can be used to encode a variety of data, from identification of key landmarks to navigation instructions, to information about upcoming traffic routing, and even advertising information. Rotational LIDAR Barcodes can also be mounted on vehicles themselves to enable vehicle identification by other LIDAR-equipped vehicles. This would be particularly useful for identifying emergency vehicles. Also, Rotational LIDAR Barcodes can be attached to traffic signs to certify their authenticity. Spoofing of traffic signs is an increasing concern for camera-based identification methods for self-driving vehicles, and an attached Rotational LIDAR Barcode can be used to encode a serial number authenticating the validity of the sign.

Although any appropriate encoding scheme is possible, the main two types of encoding are simple binary, or UPC barcode encoding. In all cases, since the message repeats itself, there should be some type of "start-of-frame" indicator. This can be encoded with a particularly distinct pattern of white/black bars, or with a bar that is much more reflective than the rest (similar to sync separators used in early analog TV).

Figure 8:
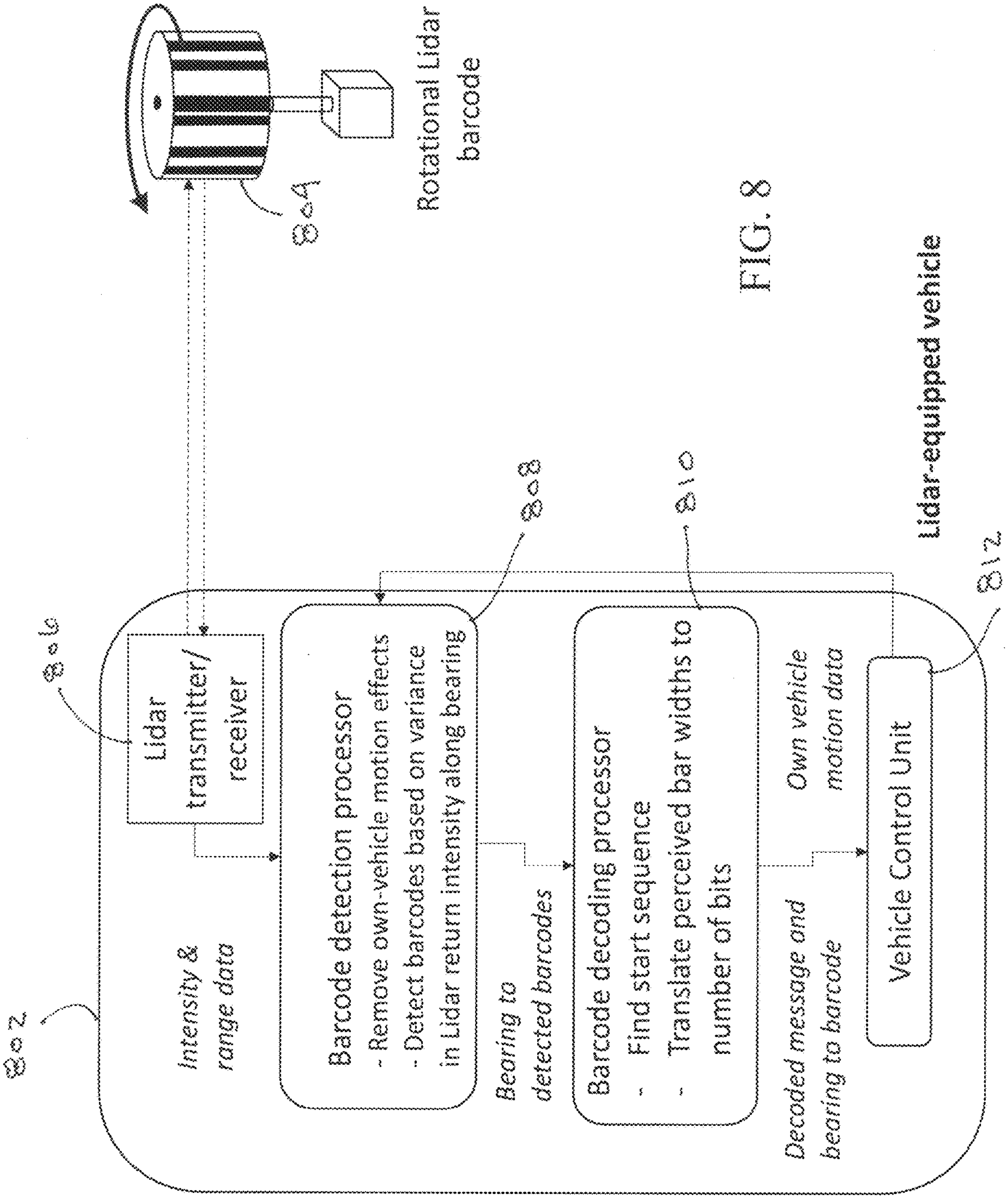
FIG. 8 is a block diagram of a LIDAR rotational barcode system, including a LIDAR-equipped vehicle and a rotational barcode according to an exemplary embodiment of this disclosure.

With reference to FIG. 8, shown is a block diagram of a LIDAR rotational barcode system, including a LIDAR-equipped vehicle and a rotational barcode according to an exemplary embodiment of this disclosure.

As shown, the system includes a rotational LIDAR barcode 804 and a LIDAR-equipped vehicle 802, such as an autonomous automobile or robot, etc. The vehicle LIDAR scanning system further includes a LIDAR transmitter/receiver 806, a barcode detection processor 808, a barcode decoding processor 810 and a vehicle control unit 812. In operation, the rotational LIDAR barcode 804 rotates at a predetermined speed and the LIDAR transmitter/receiver 806 scans the rotating LIDAR barcode 804 as the vehicle travels or at stationary points. The reflective/nonreflective light intensity signal received at the LIDAR transmitter/receiver 806 is further processed to provide intensity and range data to the barcode detection processor 808.

The barcode detection processor 808 further processes the received intensity and range data to 1) remove own-vehicle motion effects and 2) detect barcodes based on variance in LIDAR return intensity along bearing.

The barcode decoding processor 810 receives the data representing the bearing to the detected barcodes and 1) finds the start sequence, 2) translates perceived bar widths to number of bits and generates a decoded message.

The decoded message and bearing to barcode data are transmitted to the vehicle control unit 812 for further processing depending on the significance of the decoded message.

Some advantages and novel features of the disclosed exemplary embodiments include the following:

- The time-based sampling rate for the message data can be designed by selecting the rotation rate of the barcode, enabling higher bit density than conventional static barcodes.
- Rotational LIDAR Barcodes can be detected from every direction, as opposed to planar (non-rotating) Lidar retroreflectors which can only be detected from a limited set of directions.
- At close enough ranges the barcode data can be detected at multiple bearings, allowing for parallel processing as well as error detection and correction.
- At close enough ranges, Rotational LIDAR Barcodes can be detected and decoded even when they are partially obstructed from view, since the message data is available along neighboring bearings.
- Detection and decoding of Rotational LIDAR Barcodes can be accomplished at low computational cost, as compared to camera-based computer vision and artificial intelligence methods.
- Rotational barcodes can be set to either broadcast their message or remain silent, simply by turning their rotation on or off.

Some alternative representations and uses of time-varying LIDAR barcode technology includes the following.

- Two-dimensional Rotational LIDAR Barcodes (analogous to standard QR codes) for use with LIDAR systems that include both a horizontal and vertical field of view.
- Rotational LIDAR Barcodes which have different codes at different levels of the cylinder, and which move longitudinally while rotating so that a LIDAR unit with only a horizontal field of view can scan the codes in sequence.
- Rotational LIDAR Barcodes that are detected and decoded by laser scanners that operate in the visible light range.
- Rotational LIDAR Barcodes with an axis of rotation perpendicular to the LIDAR axis of rotation. In this case, the portion of the barcode that would be visible to a scanner would depend on the range of the vehicle.
- Rotational LIDAR Barcodes which use strips of materials of differing levels of reflectivity. Such barcodes could encode multiple bits of data with every "bar". For example, if a system had four distinct levels of reflectivity for each bar, then each bar could encode two bits of data.
- Systems which achieve the time-varying aspect of the barcode by using a reel-to-reel feed system.

Systems which do not rotate but achieve the time-varying aspect of the barcode by mechanically changing the position of reflectors to achieve either reflectance or non-reflectance.

Systems in which the barcode data changes over time by adjusting reflective properties of the material itself (potentially using MEMS, liquid crystal technology, etc.)

Systems supplying two or more data streams in parallel using different encoding methodologies. For example, encoding visual data (e.g. in a zoetrope-like setup).

Possible implementation with natural processes (e.g., wind, wave motion, etc.) driving the rotation of the barcode.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A rotational laser imaging, detection, and ranging (LIDAR) barcode system operatively associated with a LIDAR barcode detection system, the rotational LIDAR barcode system comprising:

a cylindrical member including an outside face, the outside face including a vertical height and a horizontal width, the horizontal width equal to a circumference of the cylinder member;

a barcode pattern operatively attached to the cylindrical member outside face, the barcode pattern including a pattern of reflective areas and nonreflective areas representing a binary barcode data message;

a rotator operatively coupled to the cylindrical member, wherein the rotator is configured to rotate the cylindrical member and operatively attached barcode pattern at a selected rotation rate from a plurality of potential rotation rates, wherein the selected rotation rate is selected to control a time-based sampling resolution for the barcode pattern; and a mount configured to align the barcode pattern, as it rotates, to reflect light received from the LIDAR barcode detecting system back to the LIDAR barcode detecting system.

2. The rotational LIDAR barcode system according to claim 1, wherein the reflective areas are one of reflective strips, and retroreflective strips.

3. The rotational LIDAR barcode system according to claim 1, wherein the rotator is one of an electric motor, a wind driven rotator and a wave driven rotator.

4. The rotational LIDAR barcode system according to claim 1, wherein the rotational LIDAR barcode is mounted to one of a vehicle, a robot, and a fixed structure.

5. The rotational LIDAR barcode system according to claim 1, wherein the reflective areas and the nonreflective areas extend along a longitudinal axis of the cylinder member.

6. The rotational LIDAR system according to claim 1, wherein the cylinder member is one of a drum, and a cylindrically shaped lattice structure.

7. The rotational LIDAR barcode system according to claim 1, wherein the rotator rotates the cylindrical member at a predetermined rotational speed which varies.

8. The rotational LIDAR barcode system according to claim 1, wherein the barcode pattern necessary to completely communicate the binary barcode data message extends more than 180 degrees around the cylindrical member outside face.

9. The rotational LIDAR barcode system according to claim 1, wherein the barcode pattern necessary to completely communicate the binary barcode data message extends more than 180 degrees around the cylindrical member outside face, and wherein the rotational LIDAR barcode is controllable to broadcast by rotating and to NOT broadcast by NOT rotating.

10. The rotational LIDAR barcode system according to claim 1, wherein a selection of the selected rotation rate creates a unique spatiotemporal signature in sensor data, and wherein the unique spatiotemporal signature enables detection of the barcode pattern in a cluttered environment by analysis of statistics of intensity data for the cluttered environment.

11. A method of encoding and decoding data represented as a barcode using a rotational laser imaging, detection, and ranging (LIDAR) barcode and a vehicle mounted LIDAR system comprising:

wrapping a cylinder face of a cylinder member with a barcode pattern including a pattern of reflective areas and nonreflective areas representing a binary barcode data message to be decoded by the vehicle mounted LIDAR system;

selecting a rotation rate from a plurality of potential rotation rates, wherein the selected rotation rate is selected to control a time-based sampling resolution for the barcode pattern:

rotating the cylinder and wrapped barcode pattern at the selected rotation rate, a rotational plane of the cylinder and wrapped barcode pattern providing for reflecting at least one beam transmitted from the vehicle mounted LIDAR system;

scanning, using the vehicle mounted LIDAR system, the rotating cylinder and wrapped barcode pattern using a time-based scanning resolution determined by the selected rotation rate; and decoding, using the vehicle mounted LIDAR system, the wrapped barcode pattern to determine the data message associated with the wrapped barcode pattern.

12. The method of encoding and decoding data represented as a barcode using a LIDAR system according to claim 11, wherein the reflective areas are one of reflective strips and retroreflective strips.

13. The method of encoding and decoding data represented as a barcode using a LIDAR system according to claim 11, wherein the rotator is one of an electric motor, a wind driven rotator and a wave driven rotator.

14. The method of encoding and decoding data represented as a barcode using a LIDAR system according to claim 11, wherein the rotational LIDAR barcode is mounted to one of another vehicle, a robot, and a fixed structure.

15. The method of encoding and decoding data represented as a barcode using a LIDAR system according to claim 11, wherein the reflective areas and the nonreflective areas extend along a longitudinal axis of the cylinder member.

16. The method of encoding and decoding data represented as a barcode using a LIDAR system according to claim 11, wherein the barcode pattern necessary to completely communicate the binary barcode data message extends more than 180 degrees around the cylindrical member outside face.

17. The method of encoding and decoding data represented as a barcode using a LIDAR system according to claim 11, wherein the barcode pattern necessary to completely communicate the binary barcode data message extends more than 180 degrees around the cylindrical member outside face, and the rotational LIDAR barcode is controllable to broadcast by rotating and NOT broadcast by NOT rotating.

18. The method of encoding and decoding data represented as a barcode using a LIDAR system according to claim 11, wherein the binary barcode data message is associated with one of a lane closure, traffic sign, parking lane, parking spot, store front, landmark, authenticity of a sign, emergency vehicle identification, traffic pattern, other vehicle and point of interest.

19. A system, comprising:
- a rotational laser imaging. detection, and ranging (LIDAR) barcode system, comprising:
  - a cylindrical member including an outside face, the outside face including a vertical height and a horizontal width, the horizontal width equal to a circumference of the cylinder member,
  - a barcode pattern operatively attached to the cylindrical member outside face, the barcode pattern including a pattern of reflective areas and nonreflective areas representing a binary barcode data message,
  - a rotator operatively coupled to the cylindrical member, wherein the rotator is configured to rotate the cylindrical member and operatively attached barcode pattern at a selected rotation rate from a plurality of potential rotation rates, wherein the selected rotation rate is selected to control a time-based sampling resolution for the barcode pattern, and
  - a mount configured to align the barcode pattern, as it rotates, to reflect light received from the vehicle mounted LIDAR system back to the vehicle mounted LIDAR system; and
- a vehicle mounted laser imaging, detection, and ranging (LIDAR) system. comprising:
  - a LIDAR transmitter configured to transmit a first LIDAR beam and a second LIDAR beam towards the rotational LIDAR barcode system, wherein the second LIDAR beam has a different bearing angle from the first LIDAR beam, and
  - a barcode detection processor configured to process, in parallel, a first beam and a second reflected beam using a time-based scanning resolution determined by the selected rotation rate, wherein the first reflected beam is a reflected version of the first LIDAR beam, and wherein the second reflected beam is a reflected version of the second LIDAR beam.

20. The system according to claim 19, wherein the reflective areas are one of reflective strips, and retroreflective strips.

21. The system according to claim 19, wherein the barcode pattern necessary to completely communicate the binary barcode data message extends more than 180 degrees around the cylindrical member outside face.

22. The system according to claim 19, wherein the binary barcode data message is associated with one of a lane closure, traffic sign, parking lane, parking spot, store front, landmark, authenticity of a sign, emergency vehicle identification, traffic pattern, other vehicle and point of interest.

23. The system according to claim 19, wherein the vehicle mounted LIDAR system is further configured to perform error detection and correction based on the first reflected beam and the second reflected beam.

24. The system according to claim 19, wherein the vehicle mounted LIDAR system is further configured to process a light intensity signal from the first reflected signal or the second reflected signal, thereby generating intensity data and range data.

25. The system according to claim 24, wherein the vehicle mounted LIDAR system is further configured to:
- remove own-vehicle motion effects; and
- detect the barcode pattern based on a variance in the intensity data.

* * * * *